Dec. 21, 1965   D. E. REIFSCHNEIDER ETAL   3,224,430
GAS WEED BURNER
Filed May 1, 1964   2 Sheets-Sheet 1

FIG.1

INVENTOR.
DARREL E. REIFSCHNEIDER
JOHN L. SNAPP
BY
William C. Babcock
ATTORNEY

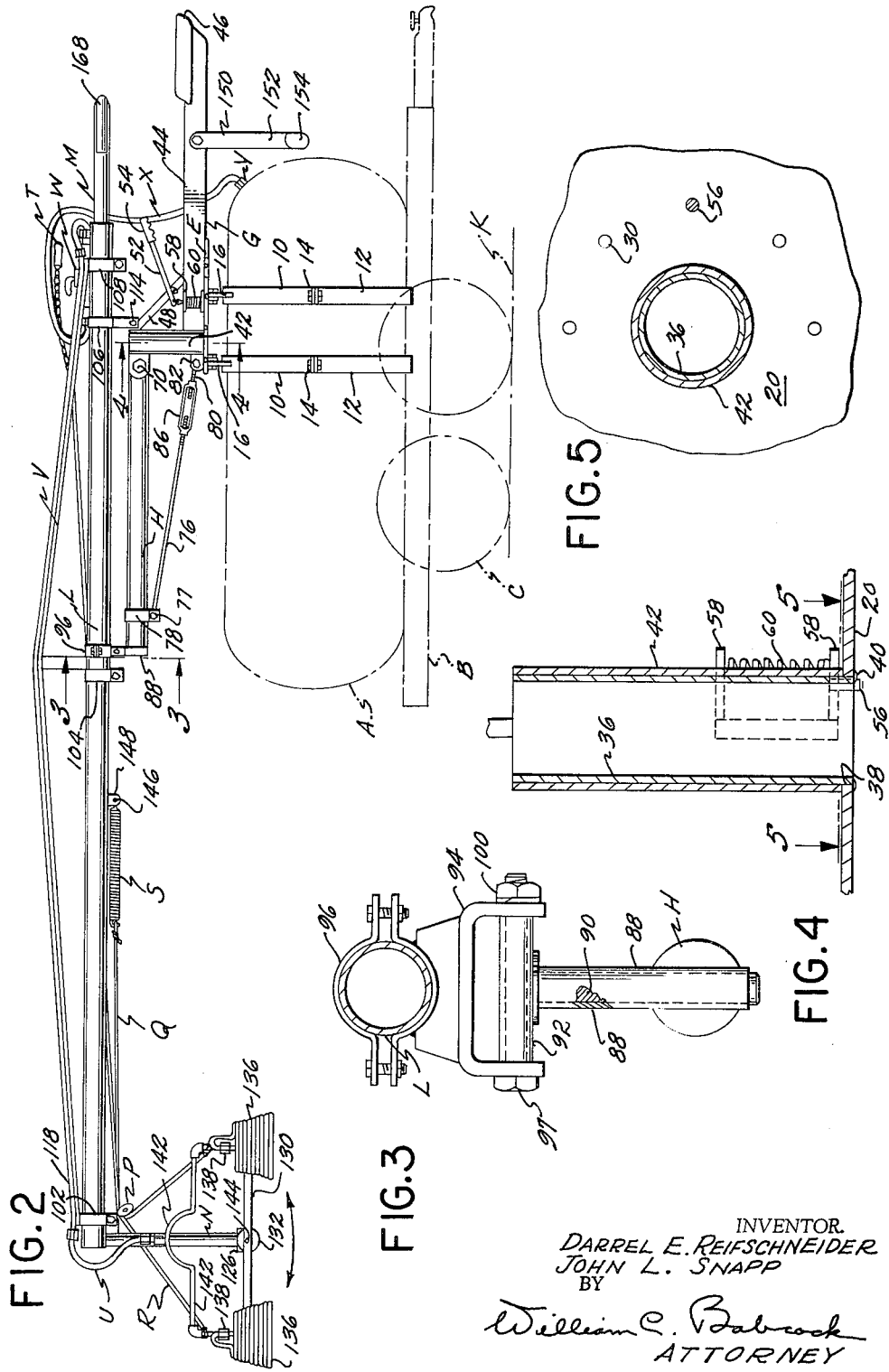

United States Patent Office 3,224,430
Patented Dec. 21, 1965

3,224,430
GAS WEED BURNER
Darrel E. Reifschneider, Compton, and John L. Snapp, Long Beach, Calif., assignors to Manchester Welding & Fabricating Company, d.b.a. Manchester Tank & Equipment Company, Lynwood, Calif., a corporation of California
Filed May 1, 1964, Ser. No. 364,092
7 Claims. (Cl. 126—271.2)

The present invention relates generally to weed control equipment, and more particularly to a weed burner supporting boom that may be removably mounted on an L-P gas tank, which tank in turn is supported on a trailer that may be drawn by a tractor or like power vehicle.

During the past few years, the control of the growth of undesirable grasses and weeds by burning has come into extensive use.

A major object of the present invention is to provide a burner unit adapted to be removably attached to a power drawn tank of L-P gas, and the unit when so mounted capable of being drawn parallel to irrigation ditches, canals, fence rows, roadsides and the like to efficiently flame grass and weeds to kill or control the same.

Another object of the invention is to provide a light weight boom supported burner assembly that can be quickly and easily mounted on existing L-P gas tanks, with the boom being counter-weighted for easy control, and the boom being pivotally supported to permit it and the burner unit to sweep over a 180° arc.

Yet another object of the invention is to supply a boom supported burner unit that can be removably locked in any one of a number of possible positions relative to the L-P tank to burn a continuous strip of weeds or grass situated on either side of the tank, and this burning operation capable of being carried out at a rate of two to three miles per hour depending on the roughness of the terrain over which the tank supporting vehicle moves and the height of the growth to be burned.

These and other objects of the invention will become apparent from the following description of a preferred form thereof, and from the drawings illustrating the same in which:

FIGURE 1 is an exploded perspective view of the burner assembly;

FIGURE 2 is a side elevational view of the burner assembly mounted on a cylindrical wheel supported L-P gas tank;

FIGURE 3 is a vertical cross-sectional view of the device taken on the line 3—3 of FIGURE 2;

FIGURE 4 is a fragmentary vertical cross-sectional view of the device taken on the line 4—4 of FIGURE 2; and FIGURE 5 is a combined horizontal cross-sectional and top plan view of the device taken on line 5—5 of FIGURE 4.

Referring now to the drawings for the general arrangement of the invention it will be seen that a cylindrical L-P gas tank A is mounted on a chassis B that is movably supported on wheels C. The chassis supported tank A is moved by power means of a conventional nature (not shown).

Two split bands D encircle tank A, and removably support a platform E in a horizontal position above the tank as best seen in FIGURE 2. A tubular post F extends upwardly from platform E. The post F as can be seen in FIGURES 1 and 2 can be engaged by a combined pivot sleeve and seat support assembly G. A supporting boom H is removably affixed to assembly G, and may be adjusted by a turnbuckle support J to a desired position relative to the ground surface K. The boom H will normally be substantially parallel to ground surface K, which surface is assumed to be smooth and flat, such as that of a concrete highway.

An elongate, light-weight tubular boom L is pivotally supported from the forward end of boom H. A combined handle and counter-weight M is adjustably mounted on the rearward end of boom L, and permits the boom to be swept through an arc of 180° from one side of tank A to the other. The boom L as can best be seen in FIGURE 2 extends rearwardly a substantial distance from tank A.

An arm N extends downwardly from the rearward extremity of boom L, with the arm pivotally supporting a burner assembly O from the lower end thereof.

A pulley P depends from the rearward end of boom L and is engaged by first and second cables Q and R respectively. First cable Q is connected to the forward end of burner assembly O and a tensioned spring S, which spring and cable at all times tend to dispose burner assembly O in a position where it tilts forwardly towards tank A. The forward tilt of burner assembly O is limited to such an angle relative to boom L that flames from the burners will not come dangerously close to tank A. The second cable R is connected to the rearward portion of burner assembly O. The second cable extends forwardly to a handle T that is affixed thereto. By pulling forwardly on the second cable R, the burner assembly O is pivoted clockwise as viewed in FIGURE 2 to have a desired angle relative to the ground surface. Gas is supplied to the burner assembly O through a flexible hose U that is connected to a tube V that extends forwardly on boom L to a pressure control valve assembly W. The assembly W is connected by a second flexible hose X to a gas outlet Y on tank A.

In detail, the split bands D are defined by two upper semi-circular sections 10, and two lower sections 12 of the same configuration. The sections 10 and 12 are removably connected by bolts 14. Bolts 14 when tightened cause the sections 10 and 12 to frictionally grip tank A with sufficient force as to remain in a fixed position thereon.

The upper sections 10 have rigid members 16 extending upwardly therefrom, with each member having a series of spaced openings 18 therein. Platform E includes a flat horizontal plate 20 that has flanges 22 projecting downwardly from the forward and rearward edges thereof. The flanges 22 have spaced openings 24 therein that can be aligned with openings 18. Bolts 26 extend through openings 18 and 24 to engage nuts 28. The bolts 26 serve to removably support plate 20 at a fixed horizontal position relative to tank A. Plate 20 has a number of accurately positioned openings 30 therein, the purpose of which will later be explained.

A rail 32 encircles plate 20. The rail 32 has a number of spaced foot engageable members 34 projecting outwardly therefrom. Post F as can best be seen in FIGURE 4 is defined by a heavy pipe 36 that has the lower extremity disposed in an opening 38 formed in plate 20. The lower extremity of pipe 36 is welded to plate 20 by a bead 40 as shown in FIGURE 4.

Sleeve and seat supporting assembly G includes a tubular sleeve 42 that rotatably engages the post F. A steel strip 44 is disposed normal to sleeve 42 and affixed to the lower end thereof. Strip 44 on the free end thereof supports a seat 46 by conventional means.

An angularly disposed rigid member 48 has the ends thereof affixed to the upper end of sleeve 42 and the strip 44. A pin or bolt 50 projects outwardly from member 48 and serves to pivotally support a lever 52 that has a handle 54 on the forward end thereof. The rearward end of lever 52 supports a link 55 that is connected to the upper end of a locking pin 56. The locking pin 56 is slidably supported for vertical movement in two spaced lugs 58 that project outwardly from strip 44. A compressed helical spring 60 is disposed between lugs 62 and engages a portion (not shown) of pin 56 to at all times urge the pin downwardly. When pin 56 is vertically aligned with one of the openings 30, the lower end of the pin moves downwardly therein to hold the sleeve and seat support assembly G at a fixed position relative to platform E. By pivoting the lever 52 downwardly, the locking pin 56 is disengaged from one of the openings 30, and the sleeve and seat support assembly is free to pivot on post F.

Two laterally spaced first lugs 62 having horizontally aligned bores 64 therein project rearwardly from the upper end portion of sleeve 42. Also, two laterally spaced second lugs 66 having horizontally aligned bores 68 therein project rearwardly from the lower portion of sleeve 42.

A bolt 70 extends through aligned bores 72 in the forward end of supporting boom H and bores 64 to support the boom in a rearwardly extending direction from sleeve 42. Bolt 70 is engaged by a nut 74 to hold the bolt at a fixed position relative to first lugs 62.

The turnbuckle support J includes an upper threaded rod 76 that is pivotally connected on its upper end by a bolt 76 to a conventional clamp 78 that frictionally grips a rearward portion of supporting boom H. The turnbuckle support J also includes a lower threaded rod 80 that is pivotally connected to a bolt 82 that extends through bores 68. The bolt 82 is engaged by a nut 84 to hold it in a fixed position in second lugs 66. The adjacent threaded ends of rods 76 and 80 are engaged by a conventional turnbuckle 86.

A vertical tube 88 is rigidly affixed to the rearward end of supporting boom H. A T-shaped boom support 90 and washer are mountable in tube 88 as shown in FIGURE 1. The support 90 includes a horizontal tubular leg 92 that is positioned in a clevis 94 that depends from a clamp 96 mounted on boom L. An elongate pin on bolt 97 extends through openings 98 in the clevis and through the bore in leg 92 to pivotally support boom L from boom H. The bolt 97 is engaged by a nut 100 to hold the bolt in a fixed position relative to the clevis.

First, second, third and fourth clamps, 102, 104, 106, and 108 respectively, frictionally grip boom L, and are longitudinally spaced thereon. An elongate angular rigid reinforcing member 110 is disposed above boom L. The rearward end of member 110 is rigidly affixed to first clamp 102, and the forward end to the fourth clamp 108. An arm 112 extends upwardly from second clamp 104, and is rigidly connected at its upper end to member 110. The third clamp 106 is removably connected by a pin or bolt 114 to a lug 116 that projects upwardly from member 48. The reinforcing member 110 supports a length of tubing 118 on the upper surface thereof. Tubing 118 on its forward end is connected to pressure control and by-pass assembly W best seen in FIGURE 1. The arm N best seen in FIGURE 1 has a lug 120 projecting from the upper end thereof that is engaged by a bolt 122 that is part of first clamp 102. Bolt 122 is engaged by a nut 124. The bolt 122 serves to removably support arm N and pulley P from the rearward end of boom L as can best be seen in FIGURES 1 and 2. Arm N on the lower end thereof supports a vertical off-set plate 126 in which an opening 128 is formed.

The burner assembly O includes an elongate rigid member 130 that has a circular plate 132 affixed to the center thereof. A bore 134 extends through member 130 and plate 132. Two burners 136 are mounted on opposite ends of member 130. Each burner 136 includes a gas discharge nozzle 138 and a length of helically wound tubing 140 connected thereto. Each length of tubing 140 is also connected to a tubular yoke 142 that in turn is connected to tubing U. Burner assembly O is pivotally supported on the lower end of arm N by a bolt 144 that extends through opening 128 and bore 134. Bolt 144 is engaged by a nut 146.

First cable Q is connected to a forwardly disposed portion of assembly O as viewed in FIGURE 2 and to the tensional spring S. The forward end of spring S is connected by a pin 146 to a lug 148 that projects downwardly from boom L. Tensional spring S at all times tends to pivot assembly O to a position where burners 136 tilt forwardly towards tank A.

The second cable R is connected to a rearward portion of burner assembly O as viewed in FIGURE 2. When cable R is pulled forwardly the burner assembly O is pivoted clockwise as viewed in FIGURE 2, to dispose the burners 136 in either a downward or rearwardly tilting position.

A foot bar assembly 150 is provided that includes a vertical member 152 and a cross piece 154 on the lower end thereof. A bolt 156 engages an opening 158 in the upper end of member 152 and an opening 160 in strip 44 to support the foot bar assembly from the strip.

The flexible hose X has conventional fittings 162 and 164 on the ends thereof, that connect to the pressure control valve assembly W and gas outlet Y respectively. Handle M includes an elongate weighted tubular member 166 that is telescopically mounted in the forward end portion of boom L. A U-shaped handle 168 is mounted on the forward end of member 162 as best seen in FIGURE 1.

The use and operation is extremely simple. The user when disposed on the seat 46 adjusts the counterweight and handle M longitudinally relative to boom L, until the boom is slightly heavy on the burner supporting end. Locking pin 56 is freed from engagement with openings 30 by pressing downwardly on lever 52. The user can now rotate the boom L to a desired position on either side of tank A, or to the rear thereof, by pressing his feet against the members 34 best seen in FIGURE 1. Burner assembly O may now be tilted to a desired angle by pulling the handle T forwardly. The burners 136 of the assembly O are now lighted, and the flaming of weeds and grass may now start.

When weeds or grass in deep ditches are to be flamed the turnbuckle 86 is rotated in a direction as to cause booms H and L to pivot in a counterclockwise direction as viewed in FIGURE 2. Should it be desired to flame weeds on both sides of a fence (not shown) the turnbuckle 86 is rotated to pivot the booms H and L upwardly to the extent that they will clear the fence. It will of course be apparent that in flaming weeds or grass in a ditch or along a fence that the tank must be drawn parallel thereto. The boom L can be pivoted to any one of a number of positions where it can be removably locked in a fixed position. These positions are determined by the number and spacing of the openings 30 on plate 20.

In using the device, the tank A can be towed at a speed of two to four miles per hour to kill the weeds. The killed weeds are allowed to dry, and later a second run is made at a speed of three to five miles per hour to be assured that all weeds are killed.

When the unit is to be moved long distances, it is preferable to remove the burner head assembly O to minimize the danger of damage to the boom.

Although the device herein shown and described is fully capable of performing the objects and providing the advantages hereinbefore mentioned, it is to be understood that it is merely a presently preferred embodiment of the invention, and that it is not to be limited to the previous description other than as defined in the following claims.

We claim:
1. The combination with a power drawn tank of fuel of a device for burning a strip of weeds or grass as said tank is moved including:

(a) a horizontal platform;
(b) means for supporting said platform at a fixed position above the tank;
(c) a post extending upwardly from said platform;
(d) a sleeve pivotally supported on said post;
(e) a seat;
(f) means for supporting said seat at a fixed position relative to said sleeve;
(g) a supporting boom pivotally mounted on said sleeve;
(h) means for angularly adjusting said supporting boom relative to said post;
(i) an elongate tubular boom extending in a generally rearwardly direction from the tank;
(j) means for supporting said elongate boom above said supporting boom;
(k) a combined counterweight and handle telescopically mounted in a first end of said elongate boom most adjacent to said seat;
(l) an arm projecting downwardly from a second end of said elongate boom;
(m) a burner assembly pivotally supported on the lower end of said arm for movement in a plane parallel to said elongate boom;
(n) first and second cables connected to forward and rearward ends of said burner assembly respectively;
(o) spring means connected to said first cable and to said elongate boom for at all times tending to pivot said burner assembly where it tilts toward said seat;
(p) a pulley supported on said second end of said elongate boom that is engaged by said second cable, said second cable extending forwardly to a position adjacent to said seat;
(q) conduit and a pressure reducing valve assembly connected to said tank to said burner assembly to supply fuel from said tank thereto; and
(r) foot engageable members supported from said platform that may be engaged by said user to pivot said supporting boom and elongate boom to a desired position on either side of said tank to burn a strip of weeds or grass as said tank is moved.

2. A device as defined in claim 1 which in addition includes:
(a) means for removably locking said supporting boom and elongate boom at any one of a plurality of positions relative to said platform.

3. A device as defined in claim 1 in which said means for supporting said platform is:
(a) a plurality of spaced bands that extend around said tank and frictionally grip the same with sufficient force as to remain in a fixed position relative thereto;
(b) a plurality of rigid members that extend upwardly from said bands;
(c) a plurality of flanges that extend downwardly from said platform adjacent to said members;
(d) a plurality of bolts that extend through aligned openings in said members and flanges; and
(e) a plurality of nuts that engage said bolts to hold the same in gripping contact with said members and flanges.

4. A device as defined in claim 1 in which said means for supporting said seat is:
(a) a rigid strip that is affixed to said sleeve and extends outwardly therefrom and normal thereto, with said seat mounted on the outermost end of said strip;

(b) an angularly disposed rigid member that extends from said sleeve to said strip;
(c) a lug projecting upwardly from said rigid member, said lug having an opening therein;
(d) a clamp that encircles said first end of said elongate boom and projects downwardly therefrom to a position adjacent to said lug; and
(e) a bolt that extends through said opening in said lug to removably engage said clamp.

5. A device as defined in claim 1 in which said means for angularly adjusting said supporting boom is:
(a) a pair of spaced lugs having aligned openings therein, said lugs projecting from said sleeve;
(b) a bolt disposed in said openings and extending between said pair of lugs;
(c) a turnbuckle;
(d) a clamp affixed to said supporting boom;
(e) an upper threaded rod pivotally supported from said clamp and engaging said turnbuckle; and
(f) a lower threaded rod pivotally supported from said bolt and engaging said turnbuckle, with said turnbuckle when rotated in one direction moving said rods away from one another to pivot said supporting boom in a direction where the second end thereof raises upwardly, and said turnbuckle when rotated in an opposite direction moving said rods towards one another where the second end of said supporting boom moves downwardly.

6. A device as defined in claim 4 in which said means for supporting said elongate boom above said supporting boom includes:
(a) a vertical tube affixed to an end of said supporting boom;
(b) a T-shaped member supported in said vertical tube, said member including a horizontal tubular portion;
(c) a clamp affixed to said elongate boom;
(d) a clevis depending from said clamp;
(e) and an elongate member that extends through oppositely disposed openings in said clevis and through said tubular portion.

7. A device as defined in claim 1 which in addition includes an off-set vertical plate on the lower end of said arm, and said burner assembly being:
(a) an elongate rigid member that has a plate affixed thereto with said plate and member having a bore extending therethrough;
(b) a bolt that extends through said bore in said plate and member and through a bore in said plate affixed to said arm to pivotally support said rigid member from said arm;
(c) a plurality of burners supported from said elongate member; and
(d) a tubular yoke connected to said burners and to said conduit and pressure reducing valve assembly.

References Cited by the Examiner

UNITED STATES PATENTS

| | | | |
|---|---|---|---|
| 828,972 | 8/1906 | Sanborn | 126—271.2 |
| 1,793,719 | 2/1931 | Reader | 126—271.2 X |
| 1,925,164 | 9/1933 | Woolery | 126—271.2 |
| 3,112,742 | 12/1963 | Merz | 126—271.2 |
| 3,172,459 | 3/1965 | Jackson | 126—271.2 X |

JAMES W. WESTHAVER, *Primary Examiner.*

CHARLES J. MYHRE, *Examiner.*